United States Patent
Okino et al.

[11] Patent Number: 5,930,360
[45] Date of Patent: Jul. 27, 1999

[54] METHOD OF SCRAMBLING THREE-DIMENSIONAL IMAGE

[75] Inventors: Toshiyuki Okino; Yukio Mori, both of Osaka, Japan

[73] Assignee: Sanyo Electric Co., Ltd., Osaka, Japan

[21] Appl. No.: 08/866,045

[22] Filed: May 30, 1997

[30] Foreign Application Priority Data

Jun. 7, 1996 [JP] Japan ................................. 8-146023

[51] Int. Cl.⁶ .......................... H04N 13/00; H04N 7/167
[52] U.S. Cl. .................. 380/10; 380/12; 380/14; 348/42
[58] Field of Search ................. 380/10, 14, 12; 348/42, 43

[56] References Cited

U.S. PATENT DOCUMENTS

| | | | |
|---|---|---|---|
| 3,358,079 | 12/1967 | Banning, Jr. | 380/14 |
| 5,001,555 | 3/1991 | Park | 358/88 |
| 5,321,748 | 6/1994 | Zeidler et al. | 380/14 |
| 5,633,682 | 5/1997 | Tahara | 348/384 |
| 5,739,844 | 4/1998 | Kuwano et al. | 348/43 |

*Primary Examiner*—Mark Hellner
*Attorney, Agent, or Firm*—Nikaido, Marmelstein, Murray & Oram LLP

[57] ABSTRACT

In a method of scrambling a three-dimensional image according to the present invention, the phase of a part of at least one of a left eye image and a right eye image constituting a three-dimensional image is shifted from the original phase in the horizontal direction.

10 Claims, 15 Drawing Sheets

FIG. 3

| ADDRESS | DATA |
|---|---|
| 0 | VAD 1 |
| 1 | D 1 |
| 2 | VAD 2 |
| 3 | D 2 |
| 4 | VAD 3 |
| 5 | D 3 |
| 6 | VAD 4 |
| 7 | D 4 |

FIG. 12

| ADDRESS | DATA |
|---|---|
| 0 | VAD 1 |
| 1 | Q 1 |
| 2 | VAD 2 |
| 3 | Q 2 |
| 4 | VAD 3 |
| 5 | Q 3 |
| 6 | VAD 4 |
| 7 | Q 4 |

METHOD OF SCRAMBLING THREE-DIMENSIONAL IMAGE

BACKGROUND OF THE INVENTION

1. Field of the Invention

The present invention relates to a method of scrambling a three-dimensional image.

2. Description of the Prior Art

In a television broadcasting system, it is considered that a program of a three-dimensional image is broadcasted. However, a method of scrambling the three-dimensional image has not been developed yet.

SUMMARY OF THE INVENTION

An object of the present invention is to provide a method of scrambling a three-dimensional image in which a three-dimensional image can be so scrambled as to be an image whose contents can be recognized but which cannot be normally viewed in three dimensions.

A first method of scrambling a three-dimensional image according to the present invention is characterized by comprising the step of shifting the phase of a part of at least one of a left eye image and a right eye image constituting a three-dimensional image from the original phase in the horizontal direction.

A second method of scrambling a three-dimensional image according to the present invention is characterized by comprising the steps of dividing either one of a left eye image and a right eye image constituting a three-dimensional image into a plurality of regions in the vertical direction, respectively setting different amounts of phase shift with respect to at least two regions out of the regions obtained by the division, and respectively shifting the phases of the images respectively corresponding to the two regions by the amounts of phase shift set with respect to the regions in the horizontal direction.

A third method of scrambling a three-dimensional image according to the present invention is characterized by comprising the steps of similarly dividing a left eye image and a right eye image constituting a three-dimensional image, respectively, into a plurality of regions in the vertical direction, selecting at least two regions in each of the left eye image and the right eye image out of the regions obtained by the division such that the two regions in the left eye image and the two regions in the right eye image respectively correspond to each other, respectively setting amounts of phase shift with respect to the selected regions such that set values differ between the regions in each of the left eye image and the right eye image out of the selected regions, and set values differ between the respective regions, which correspond to each other, in the left eye image and the right eye image out of the selected regions, and shifting the phase of the image corresponding to each of the selected regions by the amount of phase shift set with respect to the selected region.

A fourth method of scrambling a three-dimensional image according to the present invention is characterized by comprising the steps of similarly dividing a left eye image and a right eye image constituting a three-dimensional image, respectively, into a plurality of regions in the vertical direction, respectively setting amounts of phase shift with respect to the regions obtained by the division such that set values differ between the adjacent regions in each of the left eye image and the right eye image out of the regions obtained by the division, and set values differ between the respective regions, which correspond to each other, in the left eye image and the right eye image out of the regions obtained by the division, and shifting the phase of the image corresponding to each of the regions obtained by the division by the amount of phase shift set with respect to the region in the horizontal direction.

A fifth method of scrambling a three-dimensional image according to the present invention is characterized by comprising the step of changing the phase of a part of at least one of a left eye image and a right eye image constituting a three-dimensional image into a hue different from the original hue.

A sixth method of scrambling a three-dimensional image according to the present invention is characterized by comprising the steps of similarly dividing a left eye image and a right eye image constituting a three-dimensional image, respectively, into a plurality of regions in the vertical direction, selecting at least two regions in each of the left eye image and the right eye image out of the regions obtained by the division such that the two regions in the left eye image and the two regions in the right eye image respectively correspond to each other, and changing the hue of the image corresponding to a predetermined region out of the selected regions into a hue different from the original hue such that the hue of only one of the images respectively corresponding to the respective regions, which correspond to each other, in the left eye image and the right eye image out of the selected regions differs from the original hue, and the hue of only one of the images respectively corresponding to the regions in each of the left eye image and the right eye image out of the selected regions differs from the original hue.

A seventh method of scrambling a three-dimensional image according to the present invention is characterized by comprising the steps of similarly dividing a left eye image and a right eye image constituting a three-dimensional image, respectively, into a plurality of regions in the vertical direction, and changing the hue of the image corresponding to a predetermined region out of the regions obtained by the division into a hue different from the original hue such that the hue of only one of the images respectively corresponding to the respective regions, which correspond to each other, in the left eye image and the right eye image out of the selected regions differs from the original hue, and the hue of only one of the images respectively corresponding to the adjacent regions in each of the left eye image and the right eye image out of the regions obtained by the division differs from the original hue.

In the methods of scrambling a three-dimensional image in the fifth to seventh embodiments, an example of a method of changing the hue of an image corresponding to a certain area into a hue different from the original hue include a method of replacing two color difference signals of an image signal in the region.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic view showing the contents of a ROM card provided in the scramble device;

FIG. 12 is a schematic view showing the contents of a ROM card provided in the scramble device;

DETAILED DESCRIPTION OF THE PREFERRED EMBODIMENTS

Figure 1:
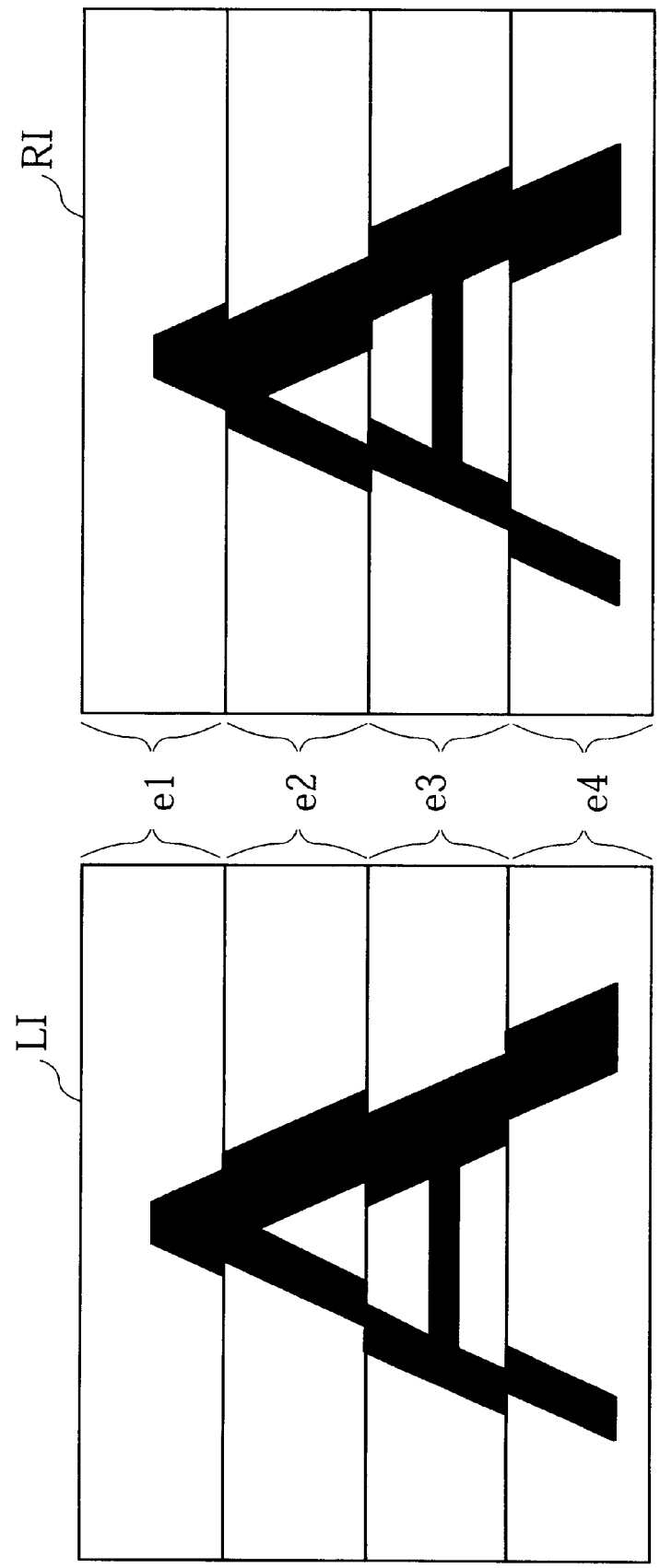
FIG. 1 is a diagram for explaining the basic idea of a scrambling method in a first embodiment of the present invention.

Referring now to the drawings, embodiments in a case where the present invention is applied to a television broadcasting system will be described.

1 Description of First Embodiment

Referring to FIGS. 1 to 9, a first embodiment of the present invention will be described.

Description is now made of the basic idea of a method of scrambling a three-dimensional image on the basis of FIG. 1.

A three-dimensional image is constituted by a left eye image and a right eye image between which there is parallax. When the three-dimensional image is sent out from a broadcasting station, the left eye image and the right eye image are alternately sent out for each field, for example. The three-dimensional image shall be referred to as a time-divisional three-dimensional image such that the left eye image and the right eye image are thus alternately sent out for each field. In the present embodiment, the time-divisional three-dimensional image is scrambled on the side of the broadcasting station, and the scrambled time-divisional three-dimensional image is sent out from the broadcasting station.

FIG. 1 illustrates a three-dimensional image (a left eye image LI and a right eye image RI) scrambled which is sent out from a broadcasting station. As shown in FIG. 1, an image region for each field is divided into a plurality of regions, that is, four regions e1 to e4 in this example in the vertical direction. The phase of the original image is shifted by an amount of phase shift determined for each of the regions e1 to e4, to produce a scrambled three-dimensional image.

The amount of phase shift for each of the regions e1 to e4 constituting the left eye image LI is so determined that there is a difference in the amount of phase shift between the adjacent regions. Similarly, the amount of phase shift for each of the regions e1 to e4 constituting the right eye image RI is so determined that there is a difference in the amount of phase shift between the adjacent regions. Further, the amount of phase shift for each of the regions e1 to e4 constituting the left eye image LI and the amount of phase shift for each of the regions e1 to e4 constituting the right eye image RI are so determined that there is a difference in the amount of phase shift between the respective regions, which correspond to each other, in the left eye image LI and the right eye image RI.

Consider a case where the three-dimensional image produced by such a method is reproduced as it is. In this case, in the respective regions, which correspond to each other, in the left eye image LI and the right eye image RI, parallax therebetween differs from normal parallax. Therefore, the image is changed into an image whose contents can be recognized but which cannot be viewed in three dimensions.

Figure 2:
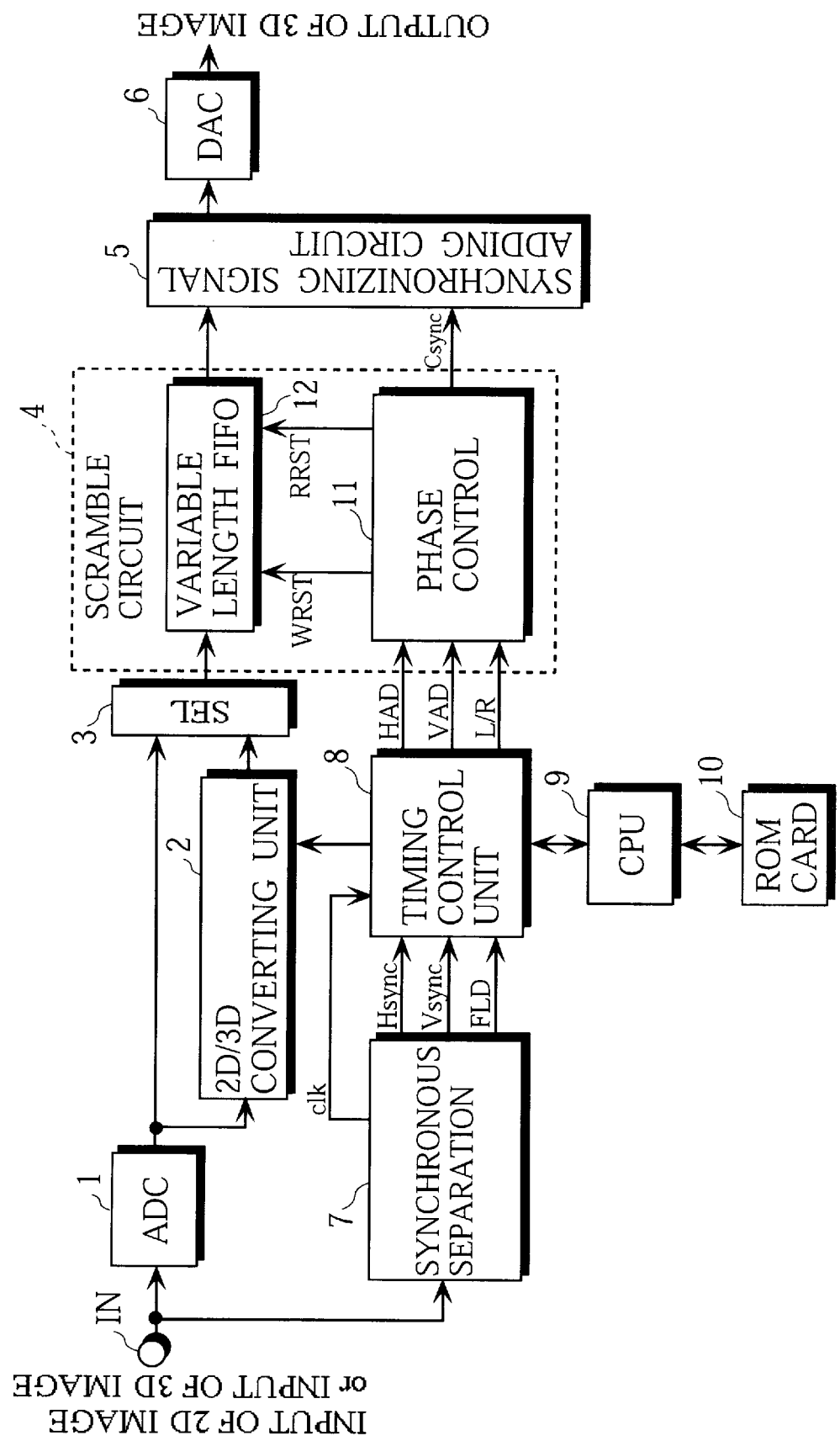
FIG. 2 is a block diagram showing the construction of a scramble device provided on the side of a broadcasting station.

FIG. 2 illustrates the construction of a scramble device (a scramble adding device) provide on the side of a broadcasting station.

A time-divisional three-dimensional image signal or a two-dimensional image signal is inputted to an input terminal IN. The time-divisional three-dimensional image signal is an image signal comprising a left eye image signal and a right eye image signal which are alternately outputted for each field. Suppose a right eye image is outputted in an odd field, and a left eye image is outputted in an even field. A case where the time-divisional three-dimensional image signal is inputted shall be referred to as a 3D input mode, and a case where the two-dimensional image signal is inputted shall be referred to as a 2D input mode.

In the case of the 3D input mode, the time-divisional three-dimensional image signal inputted to the input terminal IN is converted into a digital signal by an AD (analog-to-digital) convertor (ADC) 1, after which the digital signal is sent to a scramble circuit (a scramble adding circuit) 4 through a selecting circuit (SEL) 3. The scramble circuit 4 is a circuit for scrambling the time-divisional three-dimensional image signal, and comprises a variable length FIFO (First-In First-Out) memory 12 for temporarily storing the time-divisional three-dimensional image signal, and a phase control circuit 11 for controlling writing start timing of the time-divisional three-dimensional image signal to the FIFO memory 12 and reading start timing of the time-divisional three-dimensional image signal from the FIFO memory 12.

The time-divisional three-dimensional image signal scrambled by the scramble circuit 4 is sent to a synchronizing signal adding circuit 5, and is converted into an analog signal by a DA (digital-to-analog) converter (DAC) 6 after a synchronizing signal Csync is added thereto, after which the analog signal is outputted.

The time-divisional three-dimensional image signal inputted to the input terminal IN is also sent to a synchronous separation circuit 7. The synchronous separation circuit 7 separates a horizontal synchronizing signal Hsync, a vertical synchronizing signal Vsync and a field identification signal FLD from the inputted time-dimensional three-dimensional image signal and sends the signals to a timing control unit 8.

The field identification signal FLD is a signal indicating whether an input image field is an odd field or an even field. In this example, it reaches an L level when the input image field is an odd field, while reaching an H level when the input image field is an even field. A clock signal clk for detecting a horizontal address in each horizontal period is further outputted from the synchronous separation circuit 7. The clock signal clk is also sent to the timing control unit 8.

The timing control unit 8 produces a horizontal address signal HAD, a vertical address signal VAD and a right eye/left eye image identification signal L/R on the basis of the horizontal synchronizing signal Hsync, the vertical synchronizing signal Vsync, the field identification signal FLD and the clock signal clk and outputs the produced signals.

The horizontal address signal HAD is produced by a counter reset at the falling edge of the horizontal synchronizing signal Hsync and counting the number of clocks clk. The vertical address signal VAD is produced by a counter reset at the falling edge of the vertical synchronizing signal Vsync and counting the number of clocks up for each falling edge of the horizontal synchronizing signal Hsync. The left eye/right eye image identification signal L/R is a signal indicating whether an input image signal is a left eye image or a right eye image, which reaches an H level when the input image signal is a left eye image, while reaching an L level when the input image signal is a right eye image.

The horizontal address signal HAD, the vertical address signal VAD and the right eye/left eye identification signal L/R which are outputted from the timing control unit 8 are sent to the phase control circuit 11 in the scramble circuit 4. The phase control circuit 11 controls writing start timing of the time-divisional three-dimensional image signal to the FIFO memory 12 and reading start timing of the time-divisional three-dimensional image signal from the FIFO memory 12 on the basis of the horizontal address signal HAD, the vertical address signal VAD, the left eye/right eye image identification signal L/R and data sent from a CPU 9. The synchronizing signal Csync is sent to the synchronizing signal adding circuit 5 from the phase control circuit 11.

In the case of the 2D input mode, the two-dimensional image signal inputted to the input terminal IN is converted into a digital signal by the AD convertor (ADC) 1, after which the digital signal is sent to a 2D/3D converting unit 2. The two-dimensional image signal is converted into a time-divisional three-dimensional image signal by the 2D/3D converting unit 2, after which the time-divisional three-dimensional image signal is sent to the scramble circuit 4 through the selecting circuit (SEL) 3. Examples of the 2D/3D converting unit 2 includes one for producing from the two-dimensional image signal a main image and a sub image delayed from the main image and taking one of the main image and the sub image as a left image and the other image as a right eye image.

Furthermore, in the case of the 2D input mode, the timing control unit 8 controls the 2D/3D converting unit 2 on the basis of control data from the CPU 9, and outputs the left eye/right eye image identification signal L/R on the basis of the control data from the CPU 9.

The CPU 9 comprises a ROM card 10. The ROM card 10 stores data VAD 1 representing a vertical address at the head of the region e1 shown in FIG. 1, data D1 relating to an amount of phase shift corresponding to the region e1, data VAD2 representing a vertical address at the head of the region e2, data D2 relating to an amount of phase shift corresponding to the region e2, data VAD3 representing a vertical address at the head of the region e3, data D3 relating to an amount of phase shift corresponding to the region e3, data VAD4 representing a vertical address at the head of the region e4, data D4 relating to an amount of phase shift corresponding to the region e4, and the like, as shown in FIG. 3.

D1 and D2 are opposite in sign (negative or positive). D2 and D3 are opposite in sign (negative or positive). Further, D3 and D4 are opposite in sign (negative or positive).

Figure 4:
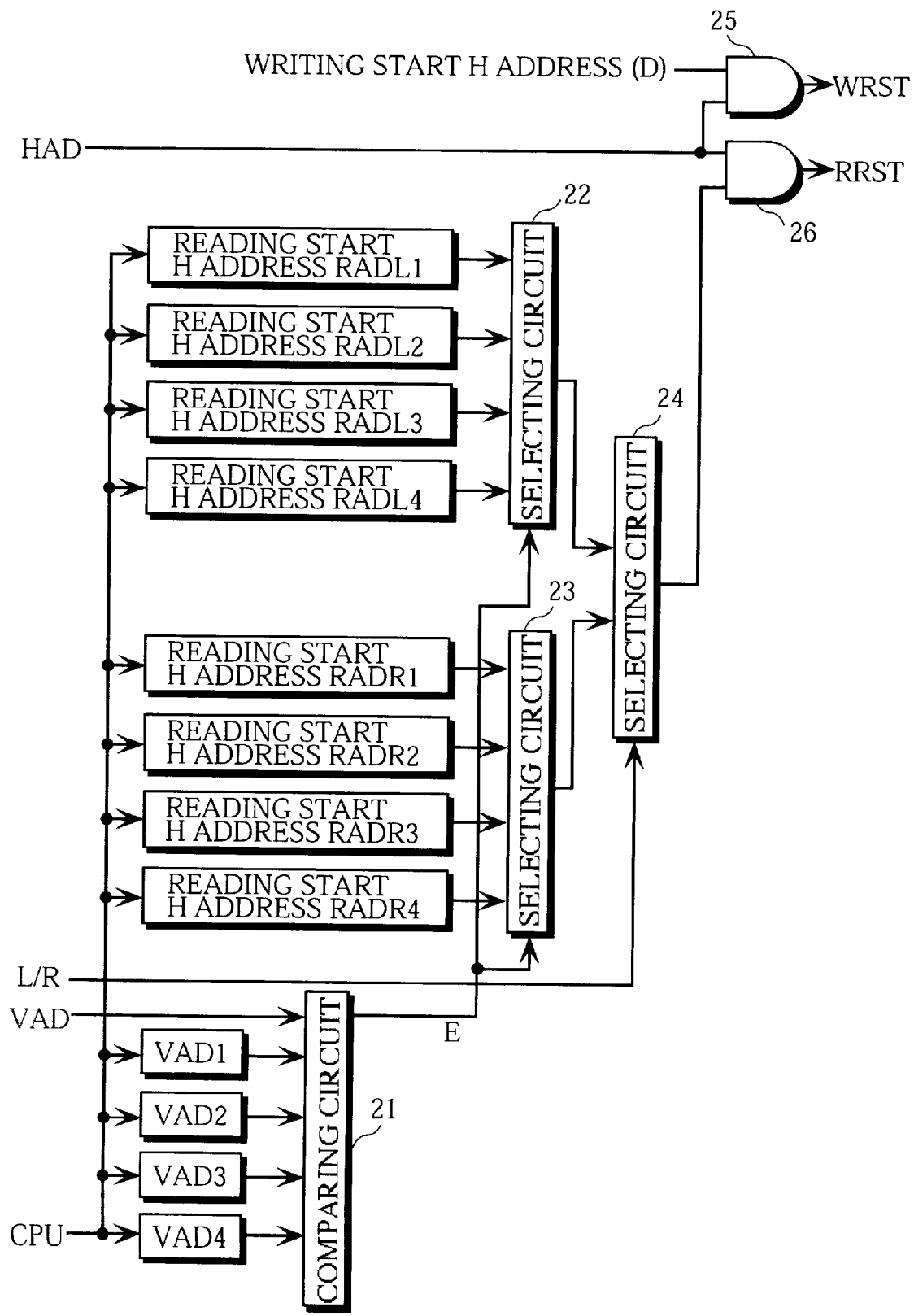
FIG. 4 is a block diagram showing the construction of a phase control circuit in a scramble circuit.
Figure 7:
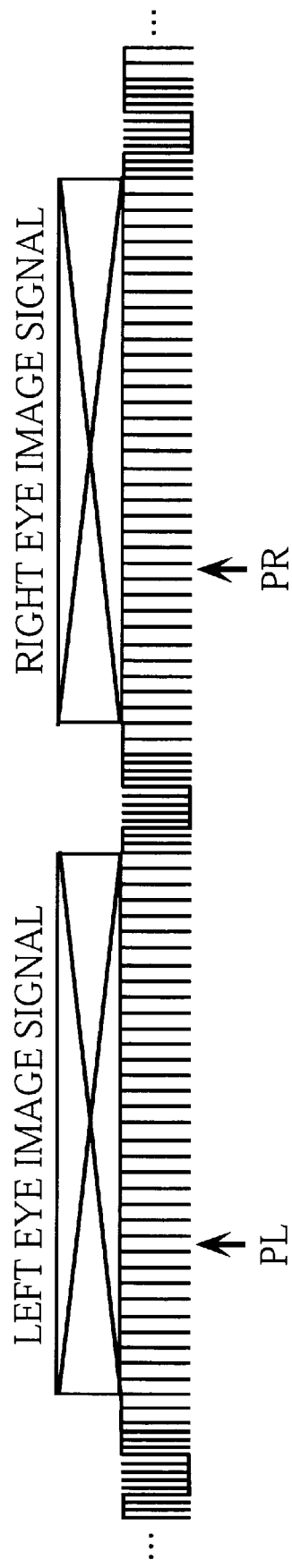
FIG. 7 is a timing chart showing a time-division three-dimensional image signal inputted to the scramble circuit.
Figure 8A:
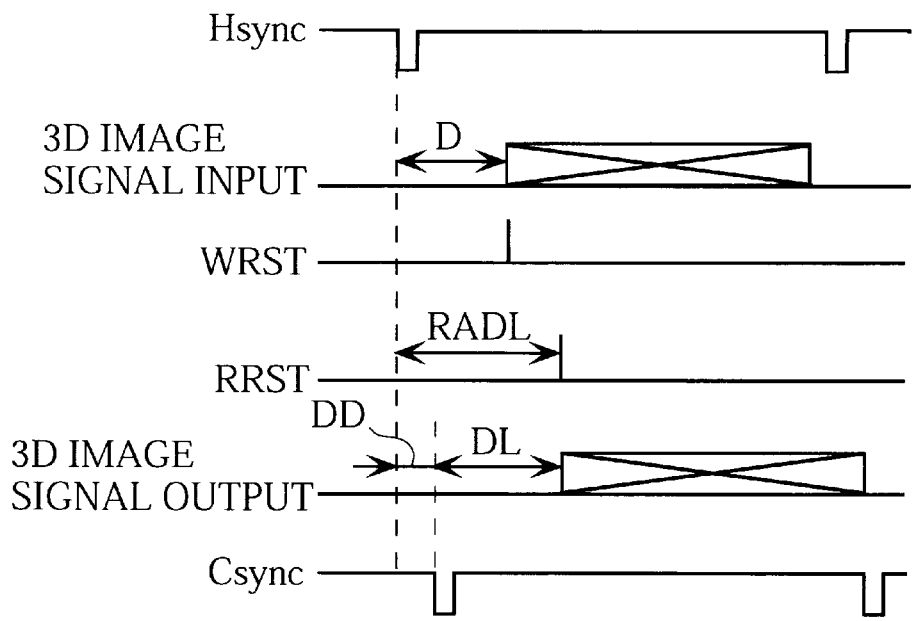
FIG. 8a is a timing chart for explaining operations performed by the scramble circuit which correspond to one horizontal period of a left eye image.
Figure 9A:
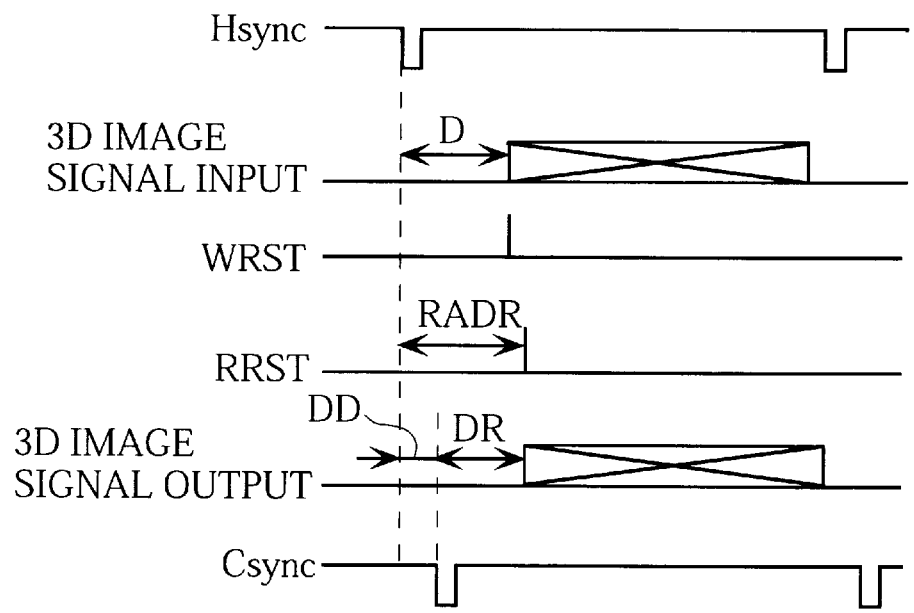
FIG. 9a is a timing chart for explaining operations performed by the scramble circuit which correspond to one horizontal period of a right eye image.

FIG. 4 illustrates the construction of the phase control circuit shown in FIG. 2. FIG. 7 illustrates the time-divisional three-dimensional image signal inputted to the scramble circuit 4 shown in FIG. 2. FIG. 8a illustrates signals in respective portions of the scramble circuit 4 in a case where an image signal in one horizontal period, which is indicated by PL in FIG. 7, in the left eye image signal is inputted to the scramble circuit 4. FIG. 9a illustrates signals in the respective portions of the scramble circuit 4 in a case where an image signal in one horizontal period, which is indicated by PR in FIG. 7, in the right eye image signal is inputted to the scramble circuit 4. The horizontal period PL in the left eye image signal and the horizontal period PR in the right eye image signal shall be in the same region out of the regions e1 to e4 shown in Fig.

The data VAD1, VAD2, VAD3 and VAD4 representing the vertical addresses at the heads of the respective regions e1 to e4 which are stored in the ROM card 10 are inputted to a comparing circuit 21 through the CPU 9. The vertical address signal VAD outputted from the timing control circuit 8 is also inputted to the comparing circuit 21. The comparing circuit 21 compares the vertical address signal VAD of the input image signal with the data VAD1, VAD2, VAD3 and VAD 4, to output a region judgment signal E indicating which of the regions e1 to e4 includes an input image. The region judgment signal E is sent to a first selecting circuit 22 and a second selecting circuit 23.

Reading start horizontal addresses RADL1, RADL2, RADL3 and RADL4 for defining reading start timing from the FIFO memory 12 for the respective regions e1 to e4 constituting the left eye image are inputted to the first selecting circuit 22. Reading start horizontal addresses RADR1, RADR2, RADR3 and RADR4 for defining reading start timing from the FIFO memory 12 for the respective regions e1 to e4 constituting the right eye image are inputted to the second selecting circuit 23.

The reading start horizontal addresses are produced by the CPU 9 on the basis of the data D1 to D4 relating to the amounts of phase shift corresponding to the respective regions e1 to e4 which are stored in the ROM card 10. A phase difference DD (see FIGS. 8a and 9a) between the horizontal synchronizing signal HAD outputted from the timing control unit 8 and the horizontal synchronizing signal (indicated by Csync in FIGS. 8a and 9a) outputted from the phase control unit 11 is fixed.

Writing start timing of the image signal in each horizontal period to the FIFO memory 12 is fixed, and a writing start horizontal address for defining the writing start timing to the FIFO memory 12 is set to a period D elapsed from the time when the horizontal synchronizing signal Hsync falls until an effective image signal is outputted.

The reading start horizontal addresses RADL1, RADL2, RADL3 and RADL4 corresponding to the respective regions e1 to e4 constituting the left image and the reading start horizontal addresses RADR1, RADR2, RADR3 and RADR4 corresponding to the respective regions e1 to e4 constituting the right eye image are expressed by the following equations:

$$RADL1 = DD + D + (D1/2)$$

$$RADL2 = DD + D + (D2/2)$$

$$RADL3 = DD + D + (D3/2)$$

$$RADL4 = DD + D + (D4/2)$$

$$RADR1 = DD + D - (D1/2)$$

$$RADR2 = DD + D - (D2/2)$$

$$RADR3 = DD + D - (D3/2)$$

$$RADR4 = DD + D - (D4/2)$$

As can be seen from the foregoing equations, one of the reading start horizontal addresses in the respective regions, which correspond to each other, in the left eye image and the right eye image is increased, while the other reading start horizontal address is decreased. Further, D1 and D2 are opposite in sign (negative or positive), D2 and D3 are opposite in sign (negative or positive), and D3 and D4 are opposite in sign (negative or positive), as described above. Therefore, one of the reading start horizontal addresses in the adjacent regions in the left eye image is increased, while the other reading start horizontal address is decreased. Similarly, one of the reading start horizontal addresses in the adjacent regions in the right eye image is increased, while the other reading start horizontal address is decreased.

The first selecting circuit 22 and the second selecting circuit 23 respectively select the reading start horizontal addresses corresponding to the region indicated by the region identification signal E outputted from the comparing circuit 21 and output the selected reading start horizontal addresses. For example, when the region identification signal E indicating the first region e1 is outputted by the comparing circuit 21, the reading start horizontal address RADL1 corresponding to the first region e1 in the left eye image is outputted from the first selecting circuit 22, and the reading start horizontal address RADR1 corresponding to the first region e1 in the right eye image is outputted from the second selecting circuit 23.

The outputs of the first and second selecting circuits 22 and 23 are sent to a third selecting circuit 24. The left eye/right eye image identification signal L/R from the timing control unit 8 is inputted to the third selecting circuit 24. The third selecting circuit 24 selects the reading start horizontal address corresponding to the eye indicated by the left eye/right eye image identification signal L/R out of the reading start horizontal addresses outputted from the first and second selecting circuits 22 and 23 and outputs the selected reading start horizontal address. For example, when the left eye/right eye image identification signal L/R is at an H level, that is, when the image signal inputted to the scramble circuit 4 is a left eye image signal, the third selecting circuit 24 selects the reading start horizontal address corresponding to the left eye image outputted from the first selecting circuit 22 and outputs the selected reading start horizontal address.

The reading start horizontal address outputted from the third selecting circuit 24 is inputted to one input terminal of a comparing circuit 26 for outputting a read address reset signal RRST. The horizontal address signal HAD outputted from the timing control unit 8 is sent to the other input terminal of the comparing circuit 26. The comparing circuit 26 outputs the read address reset signal RRST when the horizontal address signal HAD outputted from the timing control unit 8 coincides with the reading start horizontal address outputted from the third selecting circuit 24.

The horizontal address signal HAD outputted from the timing control unit 8 is also inputted to one input terminal of a comparing circuit 25 for outputting a write address reset signal WRST. A writing start horizontal address D is inputted to the other input terminal of the comparing circuit 25. The comparing circuit 25 outputs the write address reset signal WRST when the horizontal address signal HAD outputted from the timing control unit 8 coincides with the writing start horizontal address D.

As shown in FIG. 8a, writing of an effective left eye image signal in the horizontal period PL into the FIFO memory 12 is started at the time point where a period D has elapsed since the horizontal synchronizing signal Hsync fell. If it is assumed that data relating to an amount of phase shift set in a region including the horizontal period is a positive value Di, reading of the effective left eye image signal from the FIFO memory 12 is started at the time point where a period RADL=DD+D+Di/2 has elapsed since the horizontal synchronizing signal Hsync fell, as shown in FIG. 8a.

Consequently, the effective left eye image signal is outputted upon being delayed by a period DL from the time point where the horizontal synchronizing signal Csync outputted from the phase control circuit 11 falls. That is, a period elapsed from the time point where the horizontal synchronizing signal Csync falls until the effective left eye image signal is outputted is changed from D to (D+Di/2).

As shown in FIG. 9a, writing of an effective right eye image signal in the horizontal period PR into the FIFO memory 12 is started at the time point where a period D has elapsed since the horizontal synchronizing signal Hsync fell. If it is assumed that data relating to an amount of phase shift set in a region including the horizontal period is a positive value Di, reading of the effective right eye image signal from the FIFO memory 12 is started at the time point where a period RADL=DD+D−Di/2 has elapsed since the horizontal synchronizing signal Hsync fell, as shown in FIG. 9a.

Consequently, the effective right eye image signal is outputted upon being delayed by a period DR from the time point where the horizontal synchronizing signal Csync outputted from the phase control circuit 11 falls. That is, a period elapsed from the time point where the horizontal synchronizing signal Csync falls until the effective right eye image signal is outputted is changed from D to (D−Di/2).

Figure 5:
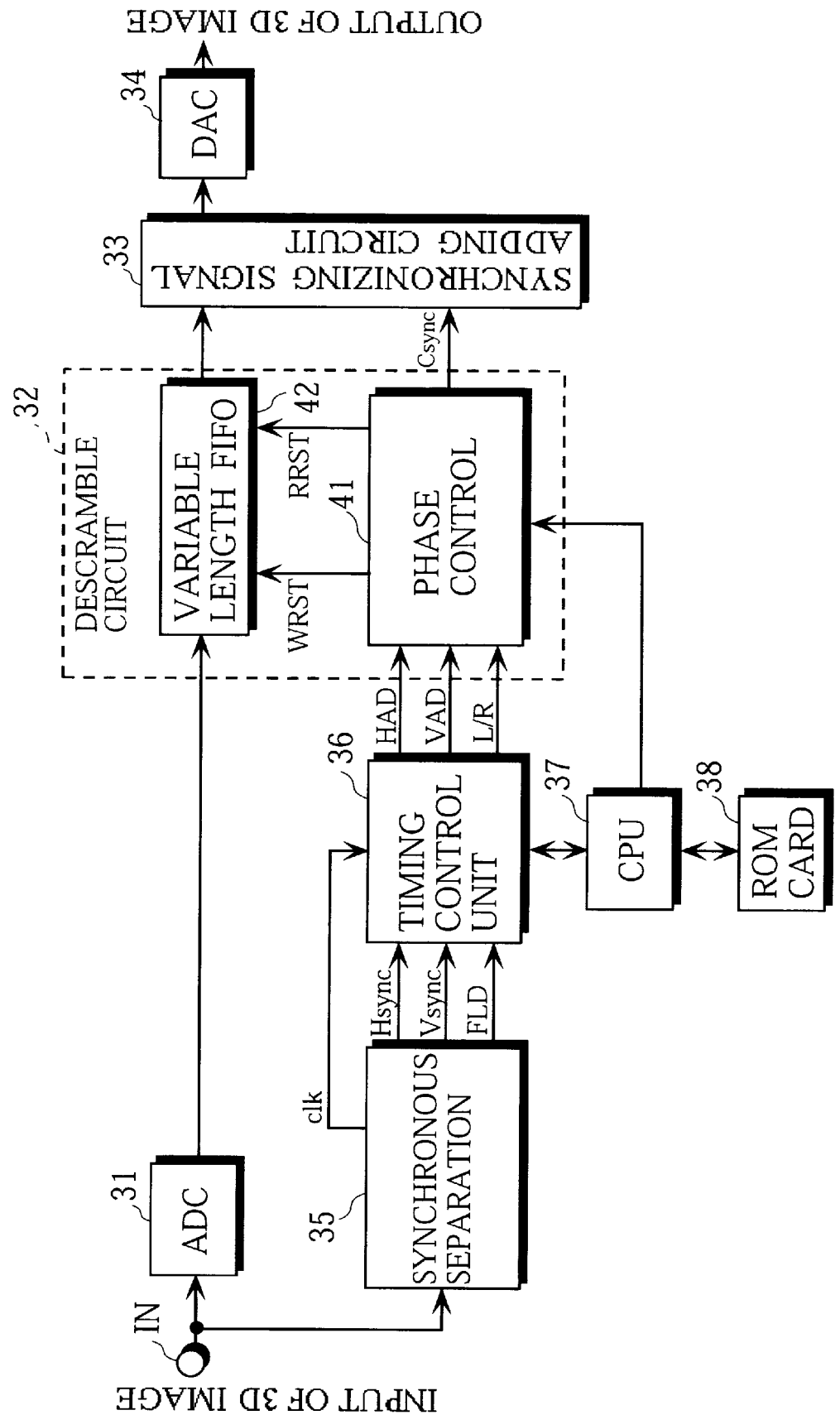
FIG. 5 is a block diagram showing the construction of a descramble device provided on the side of a receiving terminal.

FIG. 5 illustrates the construction of a descramble device (a scramble releasing device) provided on the side of a receiving terminal.

A time-dimensional three-dimensional image signal scrambled is inputted to an input terminal IN. The time-divisional three-dimensional image signal inputted to the input terminal IN is converted into a digital signal by an AD converter (ADC) 31, after which the digital signal is sent to a descramble circuit (a scramble releasing circuit) 32. The descramble circuit 32 is a circuit for releasing the scramble of the time-divisional three-dimensional image signal scrambled, and comprises a variable length FIFO memory 42 for temporarily storing the time-divisional three-dimensional image signal, and a phase control circuit 41 for controlling writing start timing of the time-dimensional three-dimensional image signal to the FIFO memory 42 and reading start timing of the time-dimensional three-dimensional image signal from the FIFO memory 42.

The time-divisional three-dimensional image signal whose scramble is released by the descramble circuit 32 is sent to a synchronizing signal adding circuit 33, and is converted into an analog signal by a DA converter (DAC) 34 after a synchronizing signal Csync is added thereto, after which the analog signal is outputted.

The time-divisional three-dimensional image signal inputted to the input terminal IN is also sent to a synchronous separation circuit 35. The synchronous separation circuit 35 separates a horizontal synchronizing signal Hsync, a vertical synchronizing signal Vsync and a field identification signal FLD from the inputted time-dimensional three-dimensional image signal, and sends the signals to a timing control unit 36. A clock signal clk for detecting a horizontal address in each horizontal period is further outputted from the synchronous separation circuit 35. The clock signal clk is also sent to the timing control unit 36.

The timing control unit 36 produces a horizontal address signal HAD, a vertical address signal VAD and a right eye/left eye image identification signal L/R on the basis of the horizontal synchronizing signal Hsync, the vertical synchronizing signal Vsync, the field identification signal FLD and the clock signal clk and outputs the produced signals.

The horizontal address signal HAD, the vertical address signal VAD and the right eye/left eye image identification signal L/R which are outputted from the timing control unit 36 are sent to the phase control circuit 41 in the descramble circuit 32. The phase control circuit 41 controls writing start timing of the time-divisional three-dimensional image signal to the FIFO memory 42 and reading start timing of the time-divisional three-dimensional image signal from the FIFO memory 42 on the basis of the horizontal address signal HAD, the vertical address signal VAD, the left eye/right eye image identification signal L/R and data sent from a CPU 37. The synchronizing signal Csync is sent to the synchronizing signal adding circuit 33 from the phase control circuit 41.

The CPU 37 comprises a ROM card 38. Data having the same contents as those of the data (see FIG. 3) stored in the ROM card 10 shown in FIG. 2 are stored in the ROM card 38.

Figure 6:
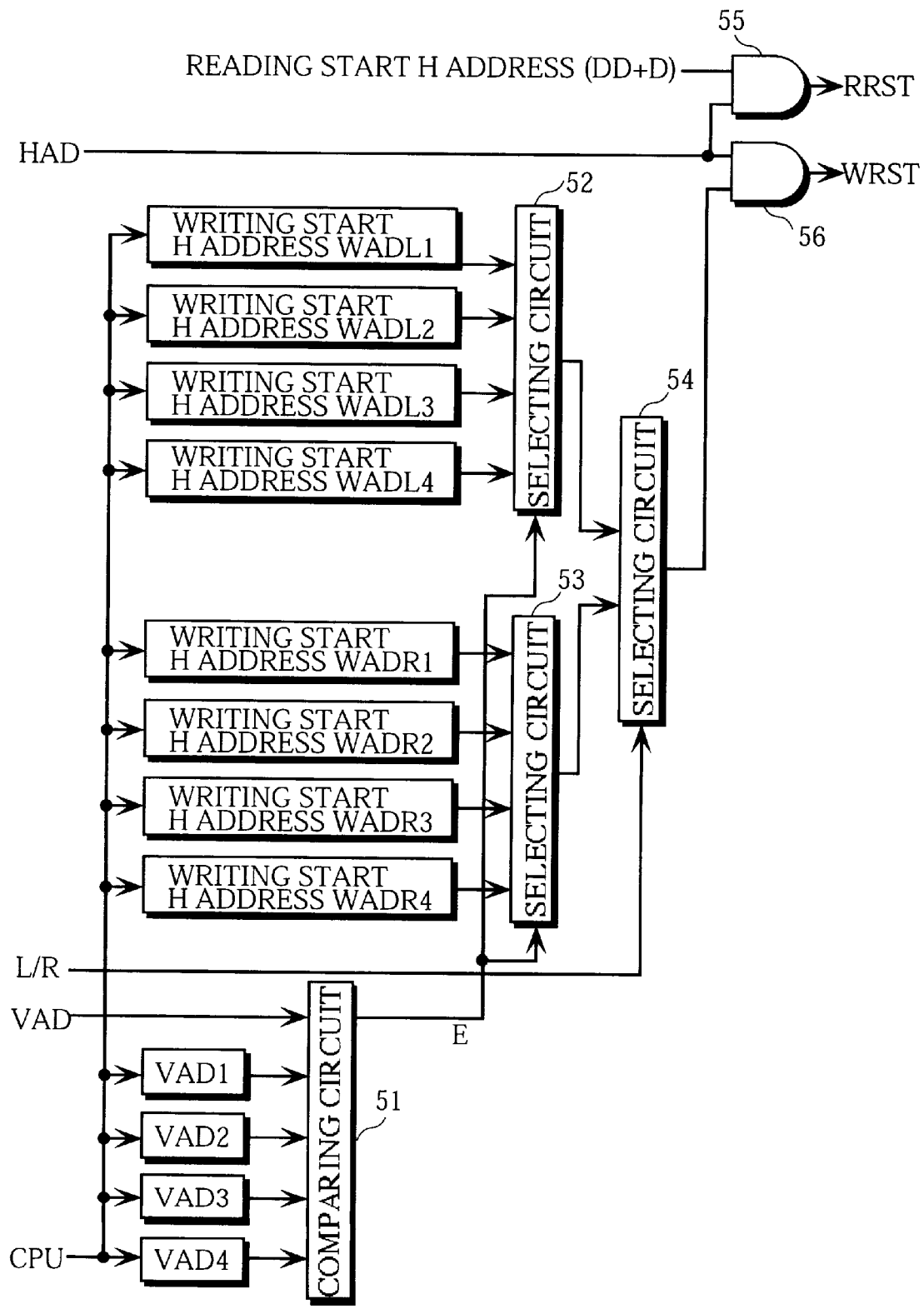
FIG. 6 is a block diagram showing the construction of a phase control circuit in a descramble circuit.
Figure 8B:
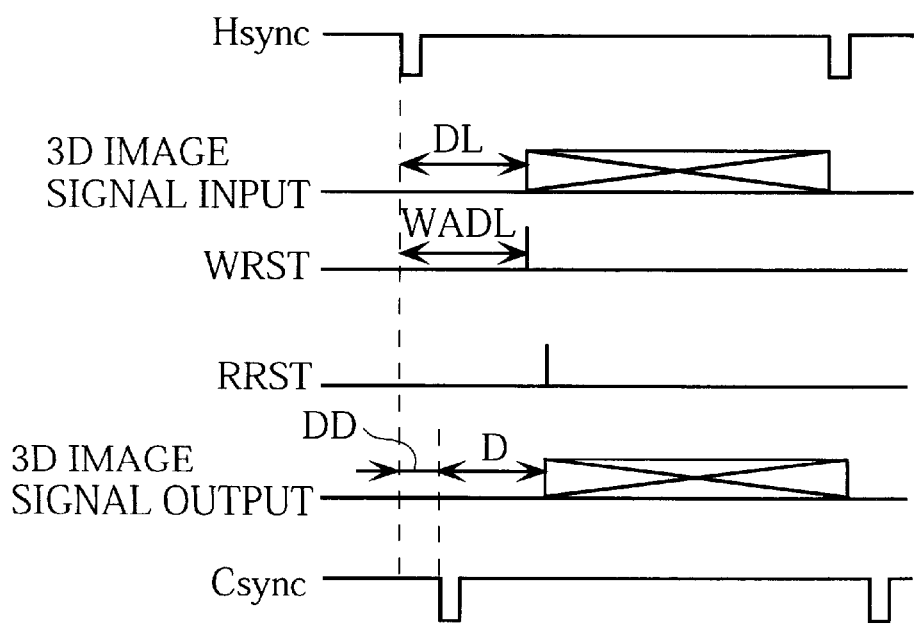
FIG. 8b is a timing chart showing signals in respective portions of the descramble circuit in a case where a left eye image signal scrambled as shown in FIG. 8a is inputted to the descramble circuit.
Figure 9B:
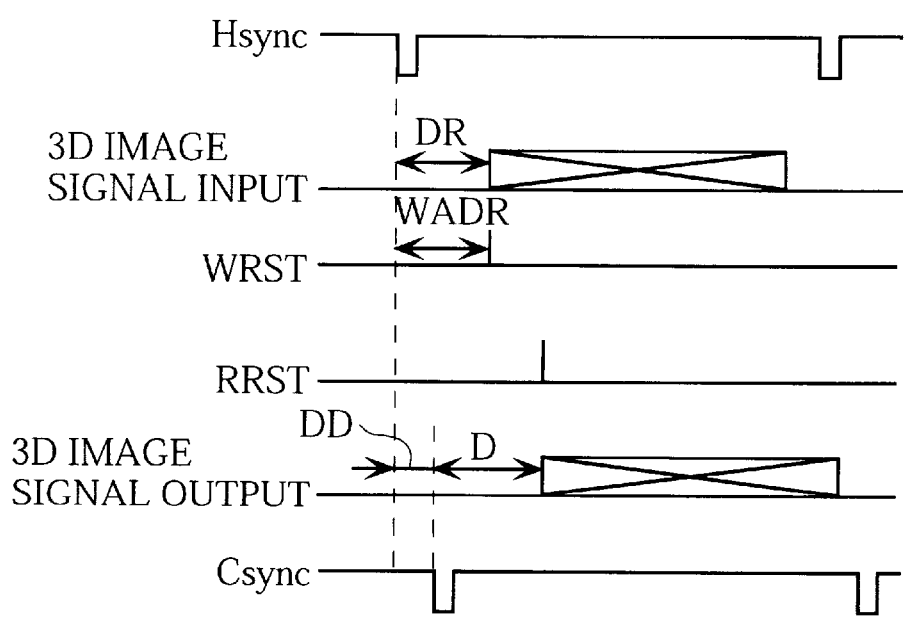
FIG. 9b is a timing chart showing signals in respective portions in the descramble circuit in a case where a right eye image signal scrambled as shown in FIG. 9a is inputted to the descramble circuit.

FIG. 6 illustrates the construction of the phase control circuit shown in FIG. 5. FIG. 8b illustrates signals in respective portions of the descramble circuit 32 in a case where a left eye image signal scrambled as shown in FIG. 8a is inputted to the descramble circuit 32. FIG. 9b illustrates signals in the respective portions of the descramble circuit 32 in a case where a right eye image signal scrambled as shown in FIG. 9a is inputted to the descramble circuit 32.

Data VAD1, VAD2, VAD3 and VAD4 representing vertical addresses at the heads of the respective regions e1 to e4 which are stored in the ROM card 38 are inputted to a comparing circuit 51. The vertical address signal VAD outputted from the timing control unit 36 is also inputted to the comparing circuit 51. The comparing circuit 51 compares the vertical address signal VAD of the input image signal with the data VAD1, VAD2, VAD3 and VAD4, to output a region judgment signal E indicating which of the regions e1 to e4 includes an input image. The region judgment signal E is sent to a first selecting circuit 52 and a second selecting circuit 53.

Writing start horizontal addresses WADL1, WADL2, WADL3 and WADL4 for defining writing start timing to the FIFO memory 42 for the respective regions e1 to e4 constituting the left eye image are inputted to the first selecting circuit 52. Writing start horizontal addresses WADR1, WADR2, WADR3 and WADR4 for defining writing start timing to the FIFO memory 42 for the respective regions e1 to e4 constituting the right eye image are inputted to the second selecting circuit 53.

The writing start horizontal addresses are produced by the CPU 37 on the basis of data D1 to D4 relating to amounts of phase shift corresponding to the respective regions e1 to e4 stored in the ROM card 38. A phase difference DD (see FIGS. 8b and 9b) between the horizontal synchronizing signal HAD outputted from the timing control unit 36 and the horizontal synchronizing signal outputted from the phase control unit 41 (indicated by Csync in FIGS. 8b and 9b) is fixed. The phase difference DD is equal to the phase difference DD shown in FIGS. 8a and 9a.

Reading start timing of the image signal in each horizontal period from the FIFO memory 42 is fixed, and a reading start horizontal address for defining the reading start timing from the FIFO memory 42 is set to the sum (D+DD) of a period D elapsed from the time when the horizontal synchronizing signal Hsync falls until an effective image signal is outputted and the above-mentioned phase difference DD in the time-dimensional three-dimensional image signal before being scrambled.

The writing start horizontal addresses WADL1, WADL2, WADL3 and WADL4 corresponding to the respective regions e1 to e4 constituting the left eye image and the writing start horizontal addresses WADR1, WADR2, WADR3 and WADR4 corresponding to the respective regions e1 to e4 constituting the right eye image are expressed by the following equations:

$$WADL1 = D+(D1/2)$$

$$WADL2 = D+(D2/2)$$

$$WADL3 = D+(D3/2)$$

$$WADL4 = D+(D4/2)$$

$$WADL1 = D-(D1/2)$$

$$WADL2 = D-(D2/2)$$

$$WADL3 = D-(D3/2)$$

$$WADL4 = D-(D4/2)$$

The first selecting circuit 52 and the second selecting circuit 53 respectively select the writing start horizontal addresses corresponding to the region indicated by the region identification signal E outputted from the comparing circuit 51 and output the selected writing start horizontal addresses. For example, when the region identification signal E indicating the first region e1 is outputted by the comparing circuit 51, the writing start horizontal address WADL1 corresponding to the first region e1 in the left eye image is outputted from the first selecting circuit 52, and the writing start horizontal address WADR1 corresponding to the first region e1 in the right eye image is outputted from the second selecting circuit 53.

The outputs of the first and second selecting circuits 52 and 53 are sent to a third selecting circuit 54. The left eye/right eye image identification signal L/R is inputted to the third selecting circuit 54 from the timing control unit 36. The third selecting circuit 54 selects the writing start horizontal address corresponding to the eye indicated by the left eye/right eye image identification signal L/R out of the writing start horizontal addresses outputted from the first and second selecting circuits 52 and 53 and outputs the selected writing start horizontal address. For example, when the left eye/right eye image identification signal L/R is at an H level, that is, when the image signal inputted to the descramble circuit 32 is a left eye image signal, the third selecting circuit 54 selects the writing start horizontal address corresponding to the left eye image outputted from the first selecting circuit 52 and outputs the selected writing start horizontal address.

The writing start horizontal address outputted from the third selecting circuit 54 is inputted to one input terminal of a comparing circuit 56 for outputting a write address reset signal WRST. The horizontal address signal HAD outputted from the timing control unit 36 is sent to the other input terminal of the comparing circuit 56. The comparing circuit 56 outputs the write address reset signal WRST when the horizontal address signal HAD outputted from the timing control unit 36 coincides with the writing start horizontal address outputted from the third selecting circuit 54.

The horizontal address signal HAD outputted from the timing control unit 36 is also inputted to one input terminal of a comparing circuit 55 for outputting a read address reset signal RRST. A reading start horizontal address (DD+D) is inputted to the other input terminal of the comparing circuit 55. The comparing circuit 55 outputs the read address reset signal RRST when the horizontal address signal HAD outputted from the timing control unit 36 coincides with the reading start horizontal address (DD+D).

As shown in FIG. 8b, writing of an effective left eye image signal indicated as a three-dimensional image signal output in FIG. 8a into the FIFO memory 42 is started at the time point where a period WADL=D+Di/2 has elapsed since the horizontal synchronizing signal Hsync fell, assuming that data relating to an amount of phase shift set in a region including a horizontal period shown in FIG. 8b is a positive value Di. Further, reading of the effective left eye image signal from the FIFO memory 42 is started at the time point where a period DD+D has elapsed since the horizontal synchronizing signal Hsync fell, as shown in FIG. 8b.

Consequently, the effective left eye image signal is outputted upon being delayed by the period D from the time point where the horizontal synchronizing signal Csync outputted from the phase control circuit 41 falls. That is, a period elapsed from the time point where the horizontal synchronizing signal Csync falls until the effective left eye image signal is outputted is returned to the period D in the three-dimensional image signal before being scrambled.

As shown in FIG. 9b, writing of an effective right eye image signal indicated as a three-dimensional image signal output in FIG. 9a into the FIFO memory 42 is started at the time point where a period WADL=D−Di/2 has elapsed since the horizontal synchronizing signal Hsync fell, assuming that data relating to an amount of phase shift set in a region including a horizontal period shown in FIG. 9b is a positive value Di. Further, reading of the effective left eye image signal from the FIFO memory 42 is started at the time point where a period DD+D has elapsed since the horizontal synchronizing signal Hsync fell, as shown in FIG. 9b.

Consequently, the effective right eye image signal is outputted upon being delayed by the period D from the time point where the horizontal synchronizing signal Csync outputted from the phase control circuit 41 falls. That is, a period elapsed from the time point where the horizontal synchronizing signal Csync falls until the effective left eye image signal is outputted is returned to the period D in the three-dimensional image signal before being scrambled.

Although in the above-mentioned first embodiment, positional information representing the vertical address at the head of each of the regions e1 to e4 for each field and information relating to the amount of phase shift corresponding to each of the regions e1 to e4 are stored in the ROM card 38 provided in the descramble device, the positional information and the information relating to the amount of phase shift may be sent to the terminal on the receiving side from a broadcasting station as scramble information. In this case, the positional information and the information relating to the amount of phase shift can be also changed for each unit of an arbitrary number of frames.

2 Description of Second Embodiment

Referring to FIGS. 10 to 14, a second embodiment of the present invention will be described.

Figure 10:
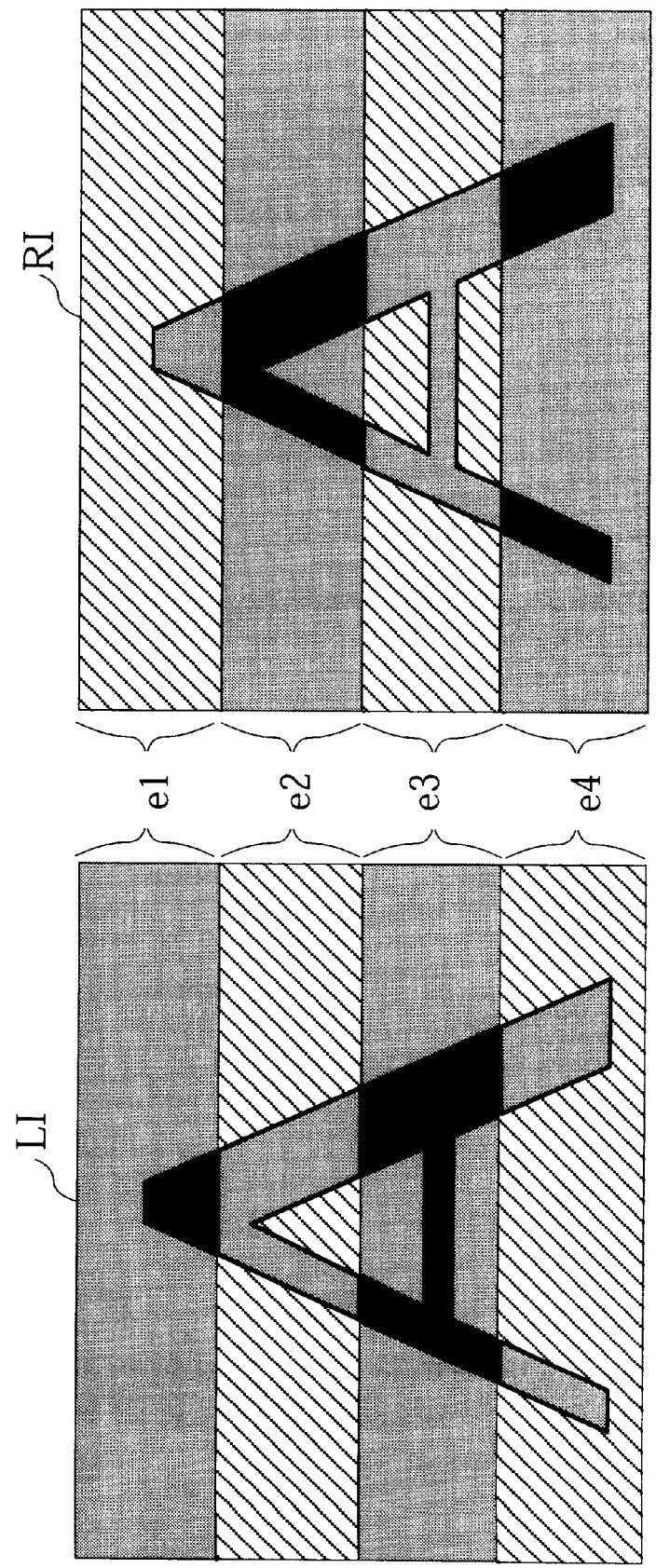
FIG. 10 is a diagram for explaining the basic idea of a scrambling method in a second embodiment of the present invention.

Description is now made of the basic idea of a method of scrambling a three-dimensional image on the basis of FIG. 10.

FIG. 10 illustrates a three-dimensional image (a left eye image LI and a right eye image RI) scrambled which is sent out from a broadcasting station. As shown in FIG. 10, an image region for each field is divided into a plurality of regions, that is, four regions e1 to e4 in this example in the vertical direction. In the respective regions, which correspond to each other, in the left eye image LI and the right eye image RI, the hue in one of the regions is taken as a normal hue, and the hue in the other region is changed into an abnormal hue, to produce a three-dimensional image scrambled.

Furthermore, in this example, in adjacent regions in the left eye image LI, the hue in one of the regions is taken as a normal hue, and the hue in the other region is changed into an abnormal hue. Similarly, in adjacent regions in the right eye image RI, the hue in one of the regions is taken as a normal hue, and the hue in the other region is changed into an abnormal hue.

More specifically, the hues in the first region e1 and the third region e3 in the left eye image LI and the second region e2 and the fourth region e4 in the right eye image RI are normal, while the hues in the second region e2 and the fourth region e4 in the left eye image LI and the first region e1 and the third region e3 in the right eye image RI are abnormal. In the embodiment as described below, two color difference signals R-Y and B-Y are replaced with each other, to produce an image having an abnormal hue.

When a three-dimensional image produced in such a method is reproduced as it is, the hue in one of the respective regions, which correspond to each other, in the let eye image LI and the right eye image RI is abnormal, whereby the image is changed into an image whose contents can be recognized but which cannot be viewed in three dimensions.

Figure 11:
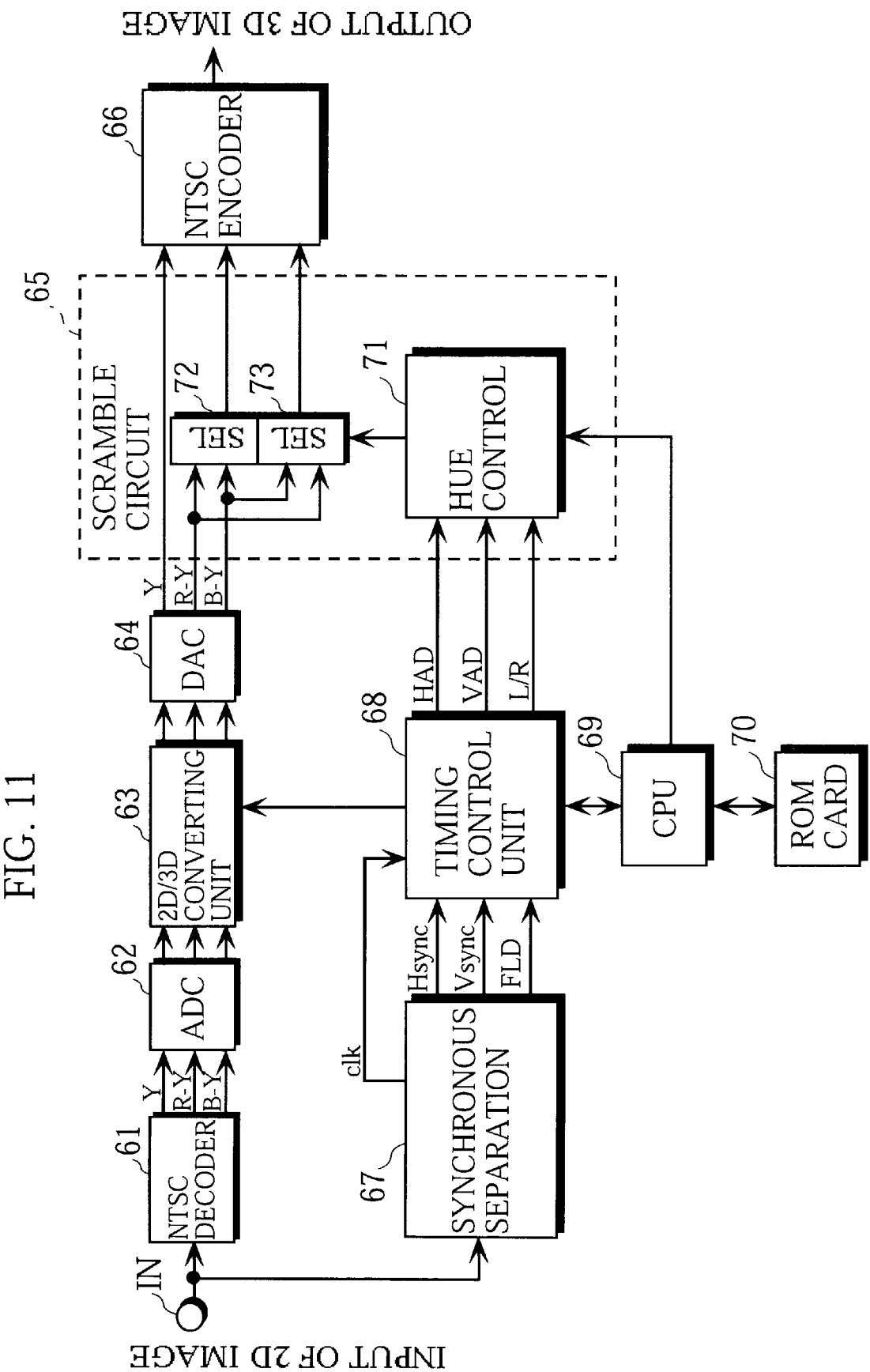
FIG. 11 is a block diagram showing the construction of a scramble device provided on the side of a broadcasting station.

FIG. 11 illustrates the construction of a scramble device (a scramble adding device) provided on the side of a broadcasting station.

Description is made of a case where a two-dimensional image is converted into a time-divisional three-dimensional image, after which the time-divisional three-dimensional image is scrambled.

A two-dimensional image signal (RGB signal) inputted to an input terminal IN is NTSC-decoded by an NTSC decoder 61, and is converted into a Y signal and two color difference signals R-Y and B-Y. The Y signal and the color difference signals R-Y and B-Y are respectively converted into digital signals by a AD converter (ADC) 62, after which the digital signals are sent to a 2D/3D converting unit 63. The Y signal, the color difference signal R-Y and the color difference signal B-Y of the two-dimensional image signal are respectively converted into a Y signal, a color difference signal R-Y and a color difference signal B-Y of a time-divisional three-dimensional image signal by a 2D/3D converting unit 63.

The Y signal, the color difference signal R-Y and the color difference signal B-Y of the time-divisional three-dimensional image signal are respectively converted into analog signals by a DA converter (DAC) 64, after which the analog signals are sent to a scramble circuit (a scramble adding circuit) 65. The scramble circuit 65 is a circuit for scrambling the time-divisional three-dimensional image signal, and comprises two selecting circuits 72 and 73 and a hue control circuit 71 for controlling the selecting circuits 72 and 73.

The Y signal outputted from the DA converter 64 is directly sent to a Y signal input terminal of an NTSC encoder 66. The color difference signal R-Y outputted from the DA converter 64 is sent to a first input terminal of the first selecting circuit 72, and is sent to a second input terminal of the second selecting circuit 73. The color difference signal B-Y outputted from the DA converter (DAC) 64 is sent to a second input terminal of the first selecting circuit 72, and is sent to a first input terminal of the second selecting circuit 73.

A switching mode in which the signal inputted to the first input terminal is selected by the first selecting circuit 72 and the signal inputted to the first input terminal is selected by the second selecting circuit 73 shall be referred to as a first mode, while a switching mode in which the signal inputted to the second input terminal is selected by the first selecting circuit 72 and the signal inputted to the second input terminal is selected by the second selecting circuit 73 shall be referred to as a second mode. The hue control circuit 71 controls the switching mode between the first mode and the second mode.

The signal selected by the first selecting circuit 72 is sent to an R-Y signal input terminal of the NTSC encoder 66. The signal selected by the second selecting circuit 73 is sent to a B-Y signal input terminal of the NTSC encoder 66.

When the switching mode of the first and second selecting circuits 72 and 73 is the first mode, therefore, the color difference signal R-Y outputted from the DA converter 64 is sent to the R-Y signal input terminal of the NTSC encoder 66, and the color difference signal B-Y outputted from the DA converter 64 is sent to the B-Y signal input terminal of the NTSC encoder 66. Consequently, the hue of the time-divisional three-dimensional image signal (RGB signal) obtained by being encoded by the NTSC encoder 66 becomes a normal hue.

When the switching mode of the first and second selecting circuits 72 and 73 is the second mode, the color difference signal R-Y outputted from the DA converter 64 is sent to the B-Y signal input terminal of the NTSC encoder 66, and the color difference signal B-Y outputted from the DA converter 64 is sent to the R-Y signal input terminal of the NTSC encoder 66. Therefore, the hue of the time-divisional three-dimensional image signal (RGB signal) obtained by being encoded by the NTSC encoder 66 becomes an abnormal hue.

The two-dimensional image signal (RGB signal) inputted to the input terminal IN is also sent to a synchronous separation circuit 67. The synchronous separation circuit 67 separates a horizontal synchronizing signal Hsync, a vertical synchronizing signal Vsync and a field identification signal FLD from the inputted two-dimensional image signal and sends the signals to a timing control unit 68. A clock signal clk for detecting a horizontal address in each horizontal period is further outputted from the synchronous separation circuit 67. The clock signal clk is also sent to the timing control unit 68.

The timing control unit 68 produces a horizontal address signal HAD, a vertical address signal VAD and a right eye/left eye image identification signal L/R on the basis of the horizontal synchronizing signal Hsync, the vertical synchronizing signal Vsync, the field identification signal FLD, the clock signal clk and data sent from a CPU 69 and outputs the produced signals.

The horizontal address signal HAD, the vertical address signal VAD and the right eye/left eye image identification signal L/R which are outputted from the timing control unit 68 are sent to the hue control circuit 71 in the scramble circuit 65. The hue control circuit 71 controls the switching mode of the first and second selecting circuits 72 and 73 on the basis of the horizontal address signal HAD, the vertical address signal VAD, the left eye/right eye image identification signal L/R and the data sent from the CPU 69.

The CPU 69 comprises a ROM card 70. The ROM card 70 stores data VAD 1 representing a vertical address at the head of the region e1 shown in FIG. 10, hue control data Q1 indicating whether or not a hue corresponding to the region e1 in the left eye image is made normal, data VAD2 representing a vertical address at the head of the region e2, hue control data Q2 indicating whether or not a hue corresponding to the region e2 in the left eye image is made normal, data VAD3 representing a vertical address at the head of the region e3, hue control data Q3 indicating whether or not a hue corresponding to the region e3 in the left eye image is made normal, data VAD4 representing a vertical address at the head of the region e4, hue control data Q4 indicating whether or not a hue corresponding to the region e4 in the left eye image, and the like, as shown in FIG. 12.

The hue control data Q1 and Q2 are one or zero, which are one in a case where the hue is made normal, while being zero in a case where the hue is made abnormal. When the hue control data Q1 is one, the hue control data Q2 and Q4 are zero, and the hue control data Q3 is one. On the other hand, when the hue control data Q1 is zero, the hue control data Q2 and Q4 are one, and the hue control data Q3 is zero. Suppose Q1=Q3=1 and Q3=Q4=0.

Figure 13:
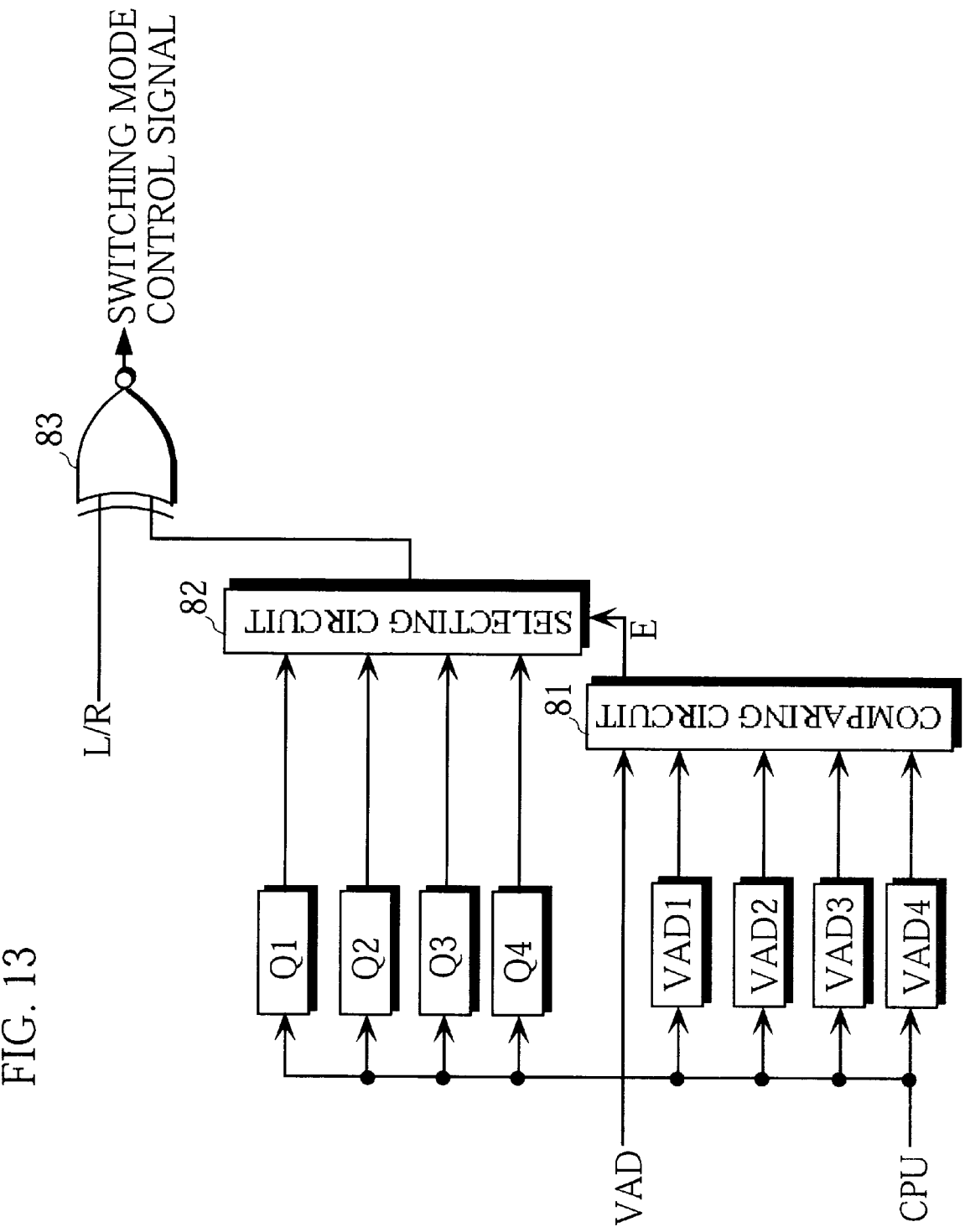
FIG. 13 is a block diagram showing the construction of a hue control circuit in a scramble circuit.

FIG. 13 illustrates the construction of the hue control circuit shown in FIG. 11.

The data VAD1, VAD2, VAD3 and VAD4 representing the vertical addresses at the heads of the respective regions e1 to e4 which are stored in the ROM card 70 are inputted to a comparing circuit 81 through the CPU 69. The vertical address signal VAD outputted from the timing control circuit 68 is also inputted to the comparing circuit 81. The comparing circuit 81 compares the vertical address signal VAD of the input image signal with the data VAD1, VAD2, VAD3 and VAD4, to output a region judgment signal E indicating which of the regions e1 to e4 includes an input image. The region judgment signal E is sent to a selecting circuit 82.

Signals corresponding to the hue control data Q1 to Q4 for the respective regions e1 to e4 constituting the left eye image are inputted to the selecting circuit 82. The selecting circuit 82 selects the hue control data Q1 to Q4 corresponding to a region indicated by the region identification signal E outputted from the comparing circuit 81 and outputs the selected data. For example, when the region identification signal E indicating the first region e1 is outputted by the comparing circuit 81, the hue control data Q1 corresponding to the first region e1 is outputted from the selecting circuit 82.

An output of the selecting circuit 82 is sent to one input terminal of an EXNOR (Exclusive-NOR) circuit 83. An output of the EXNOR circuit 83 reaches an H level when both two inputs are at an H level and are at an L level, while reaching an L level when one of the two inputs is at an H level and the other input is at an L level. The left eye/right eye image identification signal L/R outputted from the timing control unit 68 is sent to the other input terminal of the EXNOR circuit 83. The right eye/left eye image identification signal L/R reaches an H level when the signal inputted to the scramble circuit 65 is a left eye image, while reaching an L level when the input image signal is a right eye image. When the output of the EXNOR circuit 83 is a switching mode control signal, and the switching mode control signal is at an H level, the switching mode of the first and second selecting circuits 72 and 73 is switched to the first mode. On the other hand, when the switching mode control signal is at an L level, the switching mode of the first and second selecting circuits 72 and 73 is switched to the second mode.

If the signal inputted to the scramble circuit 65 is a left eye image (L/R=H) and hue control data Qi corresponding to a region where the signal is inputted is one, the switching mode control signal reaches an H level, and the switching mode of the first and second selecting circuits 72 and 73 is switched to the first mode, whereby the color difference signals R-Y and B-Y are normally inputted to the NTSC encoder 66. Therefore, the hue of the input image is not changed. In other words, the hue in a region where the hue control data is one in the left eye image is not changed.

If the signal inputted to the scramble circuit 65 is a left eye image (L/R=H) and hue control data Qi corresponding to a region where the signal is inputted is zero, the switching mode control signal reaches an L level, and the switching mode of the first and second selecting circuits 72 and 73 is switched to the second mode, whereby the color difference signals R-Y and B-Y are inputted to the NTSC encoder 66 upon being replaced. Therefore, the hue of the input image is changed. In other words, the hue in a region where the hue control data is zero in the left eye image is changed.

If the signal inputted to the scramble circuit 65 is a right eye image (L/R=L) and hue control data Qi corresponding to a region where the signal is inputted is one, the switching mode control signal reaches an L level, and the switching mode of the first and second selecting circuits 72 and 73 is switched to the second mode, whereby the color difference signals R-Y and B-Y are inputted to the NTSC encoder 66 upon being replaced. Therefore, the hue of the input image is changed. In other words, the hue in a region where the hue control data is one in the right eye image is changed.

If the signal inputted to the scramble circuit 65 is a right eye image (L/R=L) and hue control data Qi corresponding to a region where the signal is inputted is zero, the switching mode control signal reaches an H level, and the switching mode of the first and second selecting circuits 72 and 73 is switched to the first mode, whereby the color difference signals R-Y and B-Y are normally inputted to the NTSC encoder 66. Therefore, the hue of the input image is not changed. In other words, the hue in a region where the hue control data is zero in the right eye image is not changed.

Specifically, when the values of the hue control data Q1 to Q4 satisfy Q1=Q3=1 and Q2=Q4=0, the hues in the first and third regions e1 and e3 in the left eye image and the second and fourth regions e2 and e4 in the right eye image become normal hues, while the hues in the second and fourth regions e2 and e4 in the left eye image and the first and third regions e1 and e3 in the right eye image become abnormal hues.

Figure 14:
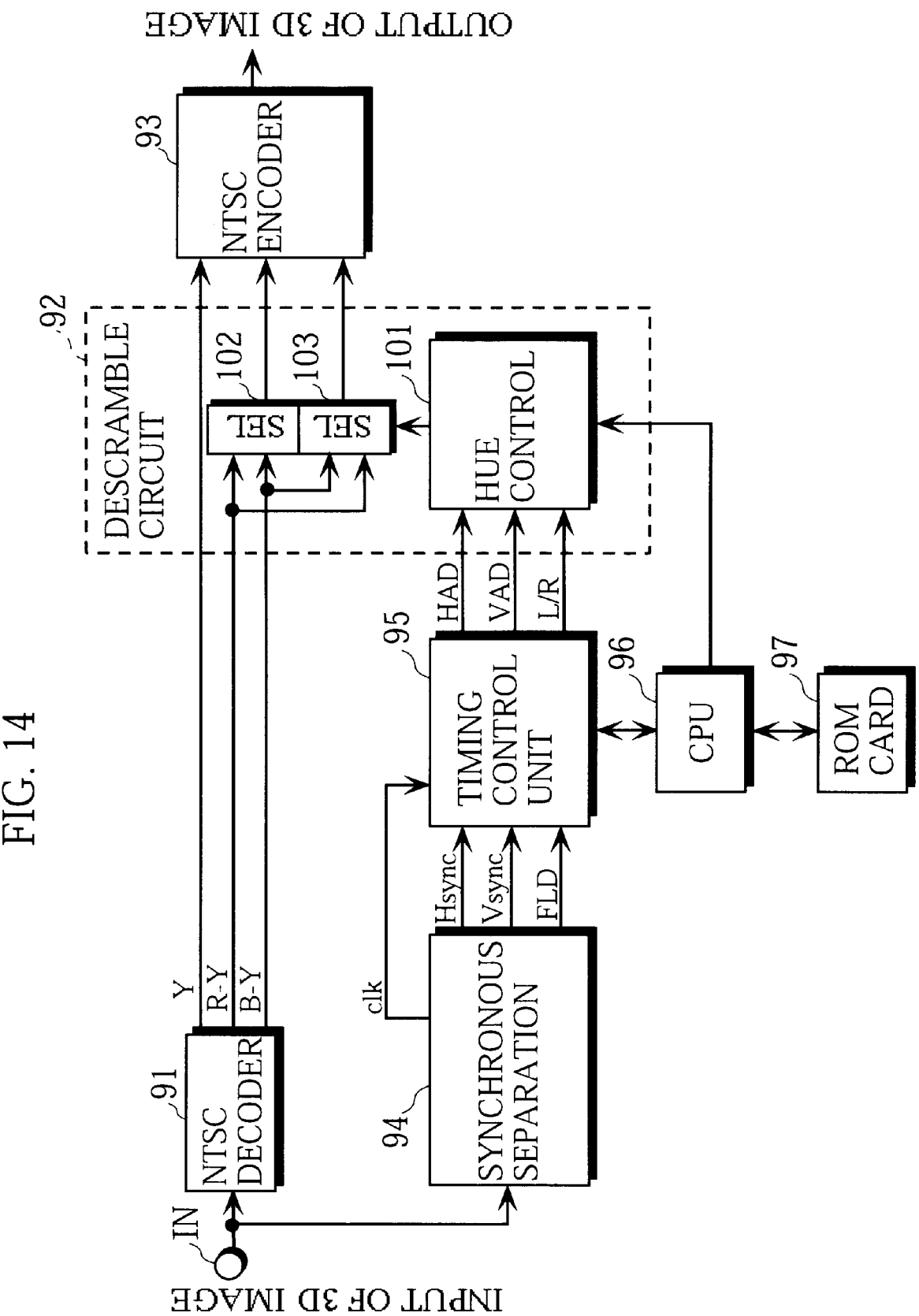
FIG. 14 is a block diagram showing the construction of a descramble device provided on the side of a receiving terminal.

FIG. 14 illustrates the construction of a descramble device (a scramble releasing device) provided on the side of a receiving terminal.

A time-dimensional three-dimensional image signal (RGB signal) scrambled is inputted to an input terminal IN. The time-divisional three-dimensional image signal inputted to the input terminal IN is NTSC-decoded by an NTSC decoder 91, and the time-divisional three-dimensional image signal is converted into a Y signal and two color difference signals R-Y and B-Y. The Y signal and the color difference signals R-Y and B-Y are sent to a descramble circuit (a scramble releasing circuit) 92. The descramble circuit 92 is a circuit for releasing the scramble of the time-divisional three-dimensional image signal scrambled, and comprises two selecting circuits 102 and 103 and a hue control circuit 101 for controlling the selecting circuits 102 and 103.

The Y signal outputted from the NTSC decoder 91 is directly sent to a Y signal input terminal of an NTSC encoder 93. The color difference signal R-Y outputted from the NTSC decoder 91 is sent to a first input terminal of the first selecting circuit 102, and is sent to a second input terminal of the second selecting circuit 103. The color difference signal B-Y outputted from the NTSC decoder 91 is sent to a second input terminal of the first selecting circuit 102, and is sent to a first input terminal of the second selecting circuit 103.

A switching mode in which the signal inputted to the first input terminal is selected by the first selecting circuit 102 and the signal inputted to the first input terminal is selected by the second selecting circuit 103 shall be referred to as a first mode, while a switching mode in which the signal inputted to the second input terminal is selected by the first selecting circuit 102 and the signal inputted to the second input terminal is selected by the second selecting circuit 103 shall be referred to as a second mode. The hue control circuit 101 controls the switching mode between the first mode and the second mode.

The signal selected by the first selecting circuit 102 is sent to an R-Y signal input terminal of the NTSC encoder 93. The signal selected by the second selecting circuit 103 is sent to a B-Y signal input terminal of the NTSC encoder 93.

When the switching mode of the first and second selecting circuits 102 and 103 is the first mode, therefore, the color difference signal R-Y outputted from the NTSC decoder 91 is sent to the R-Y signal input terminal of the NTSC encoder 93, and the color difference signal B-Y outputted from the NTSC decoder 91 is sent to the B-Y signal input terminal of the NTSC encoder 93. Therefore, the hue of the time-divisional three-dimensional image signal (RGB signal) obtained by being encoded by the NTSC encoder 93 becomes a normal hue.

On the other hand, when the switching mode of the first and second selecting circuits 102 and 103 is the second mode, the color difference signal R-Y outputted from the NTSC decoder 91 is sent to the B-Y signal input terminal of the NTSC encoder 93, and the color difference signal B-Y outputted from the NTSC decoder 91 is sent to the R-Y signal input terminal of the NTSC encoder 93. Therefore, the hue of the time-divisional three-dimensional image signal (RGB signal) obtained by being encoded by the NTSC encoder 93 becomes an abnormal hue.

The time-divisional three-dimensional image signal (RGB signal) scrambled which is inputted to the input terminal IN is also sent to a synchronous separation circuit 94. The synchronous separation circuit 94 separates a horizontal synchronizing signal Hsync, a vertical synchronizing signal Vsync and a field identification signal FLD from the inputted time-dimensional three-dimensional image signal and sends the signals to a timing control unit 95. A clock signal clk for detecting a horizontal address in each horizontal period is further outputted from the synchronous separation circuit 94. The clock signal clk is also sent to the timing control unit 95.

The timing control unit 95 produces a horizontal address signal HAD, a vertical address signal VAD and a right eye/left eye image identification signal L/R on the basis of the horizontal synchronizing signal Hsync, the vertical synchronizing signal Vsync, the field identification signal FLD, the clock signal clk and data sent from a CPU 96 and outputs the produced signals.

The horizontal address signal HAD, the vertical address signal VAD and the right eye/left eye image identification signal L/R which are outputted from the timing control unit 95 are sent to the hue control circuit 101 in the descramble circuit 92. The hue control circuit 101 controls the switching mode of the first and second selecting circuits 102 and 103 on the basis of the horizontal address signal HAD, the vertical address signal VAD, the left eye/right eye image identification signal L/R and the data sent from the CPU 96.

The CPU 96 comprises a ROM card 97. Data having the same contents as those of the data (see FIG. 12) stored in the ROM card 70 shown in FIG. 11 are stored in the ROM card 97.

The construction of the hue control circuit 101 shown in FIG. 14 is the same as the construction of the hue control circuit 71 shown in FIG. 13.

If the signal inputted to the descramble circuit 92 is a left eye image (L/R=H) and hue control data Qi corresponding to a region where the signal is inputted is one, the switching mode control signal reaches an H level, and the switching mode of the first and second selecting circuits 102 and 103 is switched to the first mode, whereby the color difference signals R-Y and B-Y are normally inputted to the NTSC encoder 93.

If the signal inputted to the descramble circuit 92 is a left eye image (L/R=H) and hue control data Qi corresponding to a region where the signal is inputted is zero, the switching mode control signal reaches an L level, and the switching mode of the first and second selecting circuits 102 and 103 is switched to the second mode, whereby the color difference signals R-Y and B-Y are inputted to the NTSC encoder 93 upon being replaced.

If the signal inputted to the descramble circuit 92 is a right eye image (L/R=L) and hue control data Qi corresponding to a region where the signal is inputted is one, the switching mode control signal reaches an L level, and the switching mode of the first and second selecting circuits 102 and 103 is switched to the second mode, whereby the color difference signals R-Y and B-Y are inputted to the NTSC encoder 93 upon being replaced.

If the signal inputted to the descramble circuit 92 is a right eye image (L/R=L) and hue control data Qi corresponding to a region where the signal is inputted is zero, the switching mode control signal reaches an H level, and the switching mode of the first and second selecting circuits 102 and 103 is switched to the first mode, whereby the color difference signals R-Y and B-Y are normally inputted to the NTSC encoder 93.

Specifically, with respect to an image signal in a region where the color difference signals R-Y and B-Y are not replaced by the scramble circuit 65 in an image sent to the terminal on the receiving side, the color difference signals R-Y and B-Y are not replaced even by the descramble circuit 92. In the above-mentioned example, with respect to the image signal in the first region e1 and the third region e3 in the left eye image and the second region e2 and the fourth region e4 in the right eye image, the color difference signals R-Y and B-Y are not replaced.

With respect to an image signal in a region where the color difference signals R-Y and B-Y are replaced by the scramble circuit 65 in an image sent to the terminal on the receiving side, the color difference signals R-Y and B-Y are replaced even by the descramble circuit 92. In the above-mentioned example, with respect to the image signal in the second region e2 and the fourth region e4 in the left eye image and the first region e1 and the third region e3 in the right eye image, the color difference signals R-Y and B-Y are replaced. Consequently, the hue of the image signal in the region where the color difference signals R-Y and B-Y are replaced by the scramble circuit 65 is returned to a normal hue.

When the time-divisional three-dimensional image signal is inputted to the scramble device provided on the side of the broadcasting station, the necessity of the AD converter 62, the 2D/3D converting unit 63 and the DA converter 64 shown in FIG. 11 is eliminated. Specifically, the Y signal, the color difference signal R-Y and the color difference signal B-Y which are outputted from the NTSC decoder 61 may be sent to the scramble device after the time-divisional three-dimensional image signal inputted to the scramble device is NTSC-decoded by the NTSC decoder 61.

Although in the above-mentioned second embodiment, positional information representing the vertical address at the head of each of the regions e1 to e4 for each field and hue control information indicating whether or not a hue corresponding to each of the regions e1 to e4 constituting the left eye image is made normal are stored in the ROM card 97 provided in the descramble device, the positional information and the hue control information may be sent to the terminal on the receiving side from the broadcasting station as scramble information. In this case, the positional information and the hue control information can be changed for each unit of an arbitrary number of frames.

In a case where a 3D image system is constituted by a 2D/3D conversion unit for converting a two-dimensional image into a three-dimensional image and a 3D monitor unit (a 2D monitor unit), if a 3D monitor unit unsuitable for the 2D/3D conversion unit is used, a normal three-dimensional image cannot be obtained even if a high performance 2D/3D conversion unit is used.

Figure 15:
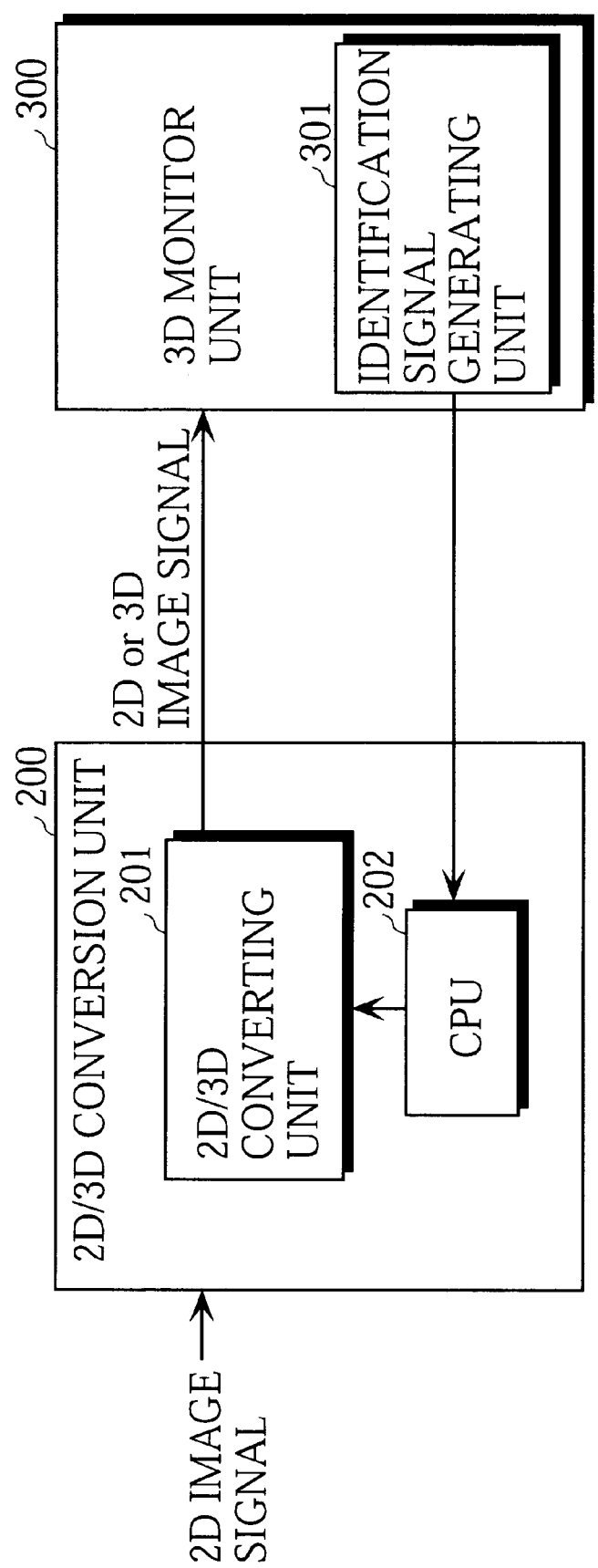
FIG. 15 is a diagram for explaining a method of converting a two-dimensional image signal into a three-dimensional image signal in a 2D/3D conversion unit only when a 3D monitor unit adapted to the 2D/3D conversion unit is used.

A method of solving such problems will be described with reference to FIG. 15. In FIG. 15, reference numeral 200 denotes a 2D/3D conversion unit, and reference numeral 300 denotes a 3D monitor unit suitable for the 2D/3D conversion unit 200. The 2D/3D conversion unit 200 comprises a 2D/3D converting unit 201 and a CPU 202 for controlling the 2D/3D converting unit 201.

The 3D monitor unit 300 suitable for the 2D/3D conversion unit 200 is provided with an identification signal generating unit 301 for generating an identification signal indicating that the 3D monitor unit is a monitor unit suitable for the 2D/3D conversion unit 200. The identification signal generating unit 301 and the CPU 202 in the 2D/3D conversion unit 200 are connected to each other by an RC (Relay Controller) 232, a PCBUS or the like, and the identification signal from the identification signal generating unit 301 is sent to the CPU 202 in the 2D/3D conversion unit 200.

The CPU 202 in the 2D/3D conversion unit 200 controls, only when it receives a normal identification signal, the 2D/3D converting unit 201 such that a two-dimensional image signal inputted to the 2D/3D conversion unit 200 is converted into a three-dimensional image signal. In this case, therefore, the three-dimensional image signal is sent to the 3D monitor unit 300.

On the other hand, the CPU 202 in the 2D/3D conversion unit 200 judges, when it does not receive a normal identification signal, that the 3D monitor unit connected to the 2D/3D conversion unit 200 is a 3D monitor unit unsuitable for the 2D/3D conversion unit 200, and controls the 2D/3D converting unit 201 such that the two-dimensional image signal inputted to the 2D/3D conversion unit 200 is sent as it is to the 3D monitor unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of scrambling a three-dimensional image, comprising the steps of:

shifting the phase of a part of at least one of a left eye image and a right eye image constituting a three-dimensional image from the original phase in the horizontal direction, wherein a resulting image is so scrambled so as to be recognizable, but which is not normally viewed in three dimensions.

2. A method of scrambling a three-dimensional image, comprising the steps of:

dividing either one of a left eye image and a right eye image constituting a three-dimensional image into a plurality of regions in the vertical direction;

respectively setting different amounts of phase shift with respect to at least two regions out of the regions obtained by the division; and respectively shifting the phases of the images respectively corresponding to the two regions by the amounts of phase shift set with respect to the regions in the horizontal direction, wherein a resulting image is so scrambled so as to be recognizable, but which is not normally viewed in three dimensions.

3. A method of scrambling a three-dimensional image, comprising the steps of:

similarly dividing a left eye image and a right eye image constituting a three-dimensional image, respectively, into a plurality of regions in the vertical direction;

selecting at least two regions in each of the left eye image and the right eye image out of the regions obtained by the division such that the two regions in the left eye image and the two regions in the right eye image respectively correspond to each other;

respectively setting amounts of phase shift with respect to the selected regions such that set values differ between the regions in each of the left eye image and the right eye image out of the selected regions, and set values differ between the respective regions, which correspond to each other, in the left eye image and the right eye image out of the selected regions; and shifting the phase of the image corresponding to each of the selected regions by the amount of phase shift set with respect to the selected region.

4. A method of scrambling a three-dimensional image, comprising the steps of:

similarly dividing a left eye image and a right eye image constituting a three-dimensional image, respectively, into a plurality of regions in the vertical direction;

respectively setting amounts of phase shift with respect to the regions obtained by the division such that set values differ between the adjacent regions in each of the left eye image and the right eye image out of the regions obtained by the division, and set values differ between the respective regions, which correspond to each other, in the left eye image and the right eye image out of the regions obtained by the division; and shifting the phase of the image corresponding to each of the regions obtained by the division by the amount of phase shift set with respect to the region in the horizontal direction.

5. A method of scrambling a three-dimensional image, comprising the steps of:

changing the hue of a part of at least one of a left eye image and a right eye image constituting a three-dimensional image into a hue different from the original hue, wherein a resulting image is so scrambled so as to be recognizable, but which is not normally viewed in three dimensions.

6. The method according to claim 5, further comprising the step of replacing two color difference signals of an image signal, to change the hue into a hue different from the original hue.

7. A method of scrambling a three-dimensional image, comprising the steps of:

similarly dividing a left eye image and a right eye image constituting a three-dimensional image, respectively, into a plurality of regions in the vertical direction;

selecting at least two regions in each of the left eye image and the right eye image out of the regions obtained by the division such that the two regions in the left eye image and the two regions in the right eye image respectively correspond to each other; and changing the hue of the image corresponding to a predetermined region out of the selected regions into a hue different from the original hue such that the hue of only one of the images respectively corresponding to the respective regions, which correspond to each other, in the left eye image and the right eye image out of the selected regions differs from the original hue, and the hue of only one of the images respectively corresponding to the regions in each of the left eye image and the right eye image out of the selected regions differs from the original hue.

8. The method according to claim 7, further comprising the step of replacing two color different signals of an image signal, to change the hue into a hue different from the original hue.

9. A method of scrambling a three-dimensional image, comprising the steps of:

similarly dividing a left eye image and a right eye image constituting a three-dimensional image, respectively, into a plurality of regions in the vertical direction; and changing the hue of the image corresponding to a predetermined region out of the regions obtained by the division into a hue different from the original hue such that the hue of only one of the images respectively corresponding to the respective regions, which correspond to each other, in the left eye image and the right eye image out of the selected regions differs from the original hue, and the hue of only one of the images respectively corresponding to the adjacent regions in each of the left eye image and the right eye image out of the regions obtained by the division differs from the original hue.

10. The method according to claim 9, further comprising the step of replacing two color difference signals of an image signal, to change the hue into a hue different from the original hue.

* * * * *